United States Patent
Chen et al.

(10) Patent No.: US 6,790,546 B2
(45) Date of Patent: Sep. 14, 2004

(54) METHOD OF HEATING AND HUMIDIFYING AT LEAST ONE OF A FUEL STREAM AND AN OXIDANT STREAM FOR A FUEL CELL

(75) Inventors: Xuesong Chen, Brampton (CA); David Frank, Scarborough (CA); Pierre Rivard, Toronto (CA); Joe Cargnelli, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 121 days.

(21) Appl. No.: 10/086,862

(22) Filed: Mar. 4, 2002

(65) Prior Publication Data

US 2002/0098397 A1 Jul. 25, 2002

Related U.S. Application Data

(62) Division of application No. 09/592,950, filed on Jun. 13, 2000, now Pat. No. 6,746,789.

(51) Int. Cl.[7] .......................... H01M 8/00; H01M 8/18; F23L 15/00
(52) U.S. Cl. .......................... 429/13; 429/17; 429/20; 429/26; 431/12
(58) Field of Search .......................... 429/17, 19, 13, 429/20, 38, 12, 26; 431/10, 11, 12; 422/305, 126; 502/527.23

(56) References Cited

U.S. PATENT DOCUMENTS

| | | |
|---|---|---|
| 3,909,299 A | 9/1975 | Corrigan |
| 5,192,627 A | 3/1993 | Perry, Jr. et al. |
| 5,248,567 A | 9/1993 | Amemiya et al. |
| 5,541,014 A | 7/1996 | Micheli et al. |
| 5,753,383 A | 5/1998 | Cargnelli et al. |
| 6,110,614 A | 8/2000 | Fellows |
| 6,376,113 B1 | 4/2002 | Edlund et al. |
| 6,416,891 B1 * | 7/2002 | Condit et al. .................. 429/13 |
| 6,472,092 B1 | 10/2002 | Matsuda et al. |

FOREIGN PATENT DOCUMENTS

| | | |
|---|---|---|
| CA | 2242176 | 12/1998 |
| EP | 0666237 | 8/1905 |
| EP | 0878443 | 11/1998 |
| JP | 63225477 | 9/1988 |
| JP | 03125807 | 5/1991 |
| JP | 58049431 | 3/1998 |
| WO | WO 0054356 | 9/2000 |

* cited by examiner

*Primary Examiner*—Raymond Alejandro
(74) *Attorney, Agent, or Firm*—Bereskin & Parr

(57) ABSTRACT

A method and apparatus are provided for humidifying fuel, and optionally oxidant, supplied to a fuel cell system, which can be a single fuel cell or a multiplicity of fuel cells. A catalytic reactor is provided, which is supplied with a portion of the fuel and the oxidant. The fuel is supplied in excess of the oxidant to the catalytic reactor, so as to generate a stream of fuel which is both heated and humidified. For a closed system, a heated and humidified fuel flow, and optionally a heated and humidified oxidant flow, are mixed with additional flows of these gases supplied to the fuel cell.

10 Claims, 5 Drawing Sheets

METHOD OF HEATING AND HUMIDIFYING AT LEAST ONE OF A FUEL STREAM AND AN OXIDANT STREAM FOR A FUEL CELL

The present application is a divisional of U.S. Ser. No. 09/592,950 that was filed on Jun. 13, 2000 now U.S. Pat. No. 6,746,789.

FIELD OF THE INVENTION

This invention relates to electrochemical fuel cells, more particularly electrochemical fuel cells which employ hydrogen as a fuel and receive an oxidant to convert the hydrogen to electricity and heat. This invention is even more particularly concerned with the humidification requirements of such an electrochemical fuel cell employing a proton exchange membrane.

BACKGROUND OF THE INVENTION

Generally, a fuel cell is a device which converts the energy of a chemical reaction into electricity. It differs from a battery in that the fuel cell can generate power as long as the fuel and oxidant are supplied.

A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte and catalyst to produce electrons and cations in the first electrode. The electrons are circulated from the first electrode to a second electrode through an electrical circuit connected between the electrodes. Cations pass through the electrolyte to the second electrode. Simultaneously, an oxidant, typically air, oxygen enriched air or oxygen, is introduced to the second electrode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product, such as water. The first electrode or anode may alternatively be referred to as a fuel or oxidizing electrode, and the second electrode may alternatively be referred to as an oxidant or reducing electrode. The half-cell reactions at the two electrodes are as follows:

First Electrode: 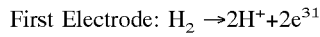
Second Electrode: 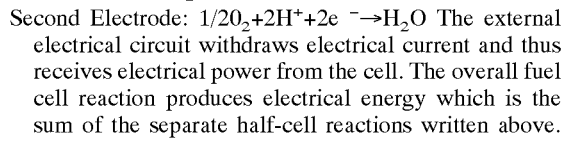 The external electrical circuit withdraws electrical current and thus receives electrical power from the cell. The overall fuel cell reaction produces electrical energy which is the sum of the separate half-cell reactions written above. Water and heat are typical by-products of the reaction.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a cooling medium. Also within the stack are current collectors, cell-to-cell seals and insulation, with required piping and instrumentation provided externally to the fuel cell stack. The stack, housing, and associated hardware make up the fuel cell module.

Fuel cells may be classified by the type of electrolyte, which is either liquid or solid. The present invention is primarily concerned with fuel cells using a solid electrolyte, such as a proton exchange membrane (PEM). The PEM has to be kept moist with water because the available membranes will not operate efficiently when dry. Consequently, the membrane requires constant humidification during the operation of the fuel cell, normally by adding water to the reactant gases, usually hydrogen and air.

The proton exchange membrane used in a solid polymer fuel cell acts as the electrolyte as well as a barrier for preventing the mixing of the reactant gases. An example of a suitable membrane is a copolymeric perfluorocarbon material containing basic units of a fluorinated carbon chain and sulphonic acid groups. There may be variations in the molecular configurations of this membrane. Excellent performances are obtained using these membranes if the fuel cells are operated under fully hydrated, essentially water-saturated conditions. As such, the membrane must be continuously humidified, but at the same time the membrane must not be over humidified or flooded as this degrades performances. Furthermore, the temperature of the fuel cell stack must be kept above freezing in order to prevent freezing of the stack.

Cooling, humidification and pressurization requirements increase the cost and complexity of the fuel cell, reducing its commercial appeal as an alternative energy supply in many applications. Accordingly, advances in fuel cell research are enabling fuel cells to operate without reactant conditioning, and under air-breathing, atmospheric conditions while maintaining usable power output.

The current state-of-the-art in fuel cells, although increasingly focusing on simplified air-breathing, atmospheric designs, has not adequately addressed operations in sub-zero temperatures, which requires further complexity in the design. For instance, heat exchangers and thermal insulation are required, as are additional control protocols for startup, shut-down, and reactant humidifiers.

Where a solid polymer proton exchange membrane (PEM) is employed, this is generally disposed between two electrodes formed of porous, electrically conductive material. The electrodes are generally impregnated or coated with a hydrophobic polymer such as polytetrafluoroethylene. A catalyst is provided at each membrane/electrode interface, to catalyze the desired electrochemical reaction, with a finely divided catalyst typically being employed. The membrane/electrode assembly is mounted between two electrically conductive plates, each which has at least one fluid flow passage formed therein. The fluid flow conductive fuel plates are typically formed of graphite. The flow passages direct the fuel and oxidant to the respective electrodes, namely the anode on the fuel side and the cathode on the oxidant side. The electrodes are electrically connected in an electric circuit, to provide a path for conducting electrons between the electrodes. In a manner that is conventional, electrical switching equipment and the like can be provided in the electric circuit as in any conventional electric circuit. The fuel commonly used for such fuel cells is hydrogen, or hydrogen rich reformate from other fuels ("reformate" refers to a fuel derived by reforming a hydrocarbon fuel into a gaseous fuel comprising hydrogen and other gases). The oxidant on the cathode side can be provided from a variety of sources. For some applications, it is desirable to provide pure oxygen, in order to make a more compact fuel cell, reduce the size of flow passages, etc. However, it is common to provide air as the oxidant, as this is readily available and does not require any separate or bottled gas supply. Moreover, where space limitations are not an issue, e.g. stationary applications and the like, it is convenient to provide air at atmospheric pressure. In such cases, it is common to simply provide channels through the stack of fuel cells to allow for flow of air as the oxidant, thereby greatly simplifying the overall structure of the fuel cell assembly. Rather than having to provide a separate circuit for oxidant, the fuel cell stack can be arranged simply to provide a vent, and possibly some fan or the like to enhance air flow.

Catalytic burners are also known and operate on a principle similar to fuel cells, but at an accelerated kinetic rate and increased temperature. A fuel, for example hydrogen, is oxidized through direct contact with oxygen or air at a rate induced by the presence of a catalytic bed, for example, ceramic beads containing small amounts of platinum on the surface.

The by-product of the chemical reaction is similar to that of a fuel cell, but without any generation of electricity:

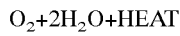
$O_2+2H_2O+HEAT$

The higher consumption rate of the reactants and concomitant heat release reflects the fact that the reaction occurs through direct contact rather than through a proton/electron transaction. Catalytic burning is flameless, and occurs at a temperature between that of a fuel cell's "cold combustion" and that of an openflame combustion. Flow rate can be pulsed or modulated to achieve varying heat and moisture profiles. Hydrogen catalytic burning requires no pilot flame or spark to be initiated.

An example of a proposal for a catalytic burner is found in an article entitled "Catalytic Combustion of Hydrogen in a Diffusive Burner" by K. Stephen and B. Dahm at pages 1483–1492 of Catalytic Combustion of Hydrogen in a Diffusive Burner.

SUMMARY OF THE INVENTION

In the prior art, humidification through membrane stack provided humidification only, without imparting significant temperature shift. In the present invention, both humidification and temperature are imparted to the stream prior to admission to the stack.

A further aspect of the present invention provides a method of operating a fuel cell system comprising a plurality of fuel cells, each fuel cell comprising an inlet for fuel, an anode having a catalyst associated therewith for producing cations from fuel, a fuel manifold connected between the inlet and the anode for distributing fuel to the anode, an oxidant inlet means for supplying oxidant, a cathode having a catalyst associated therewith and connected to the oxidant inlet means for producing anions from the oxidant, said anions reacting with said cations to form water on said cathode and an ion exchange membrane disposed between the anode and the cathode, for facilitating migration of cations from the anode to the cathode, while isolating the fuel and oxidant from one another, the method comprising (a) supplying oxidant and fuel to the fuel cell for reaction to generate electrical power and heat;

(b) supplying fuel to the catalytic reactor and oxidant to the catalytic reactor, in an amount greater than the stoichiometric amount required for the combustion of the fuel, to ensure complete combustion of the fuel, thereby generating a flow of heated and humidified oxidant;

(c) supplying the heated and humidified oxidant to the fuel cell, for reaction with the fuel to generate electricity and heat.

For initial start-up below a preset temperature, the method can comprise initially supplying fuel and oxidant only to the catalytic reactor to generate a flow of heated and moistened oxidant, and passing the heated and moistened oxidant through the fuel cell to preheat the fuel cell, and commencing supply of fuel to the fuel cell, once the fuel cell reaches a desired temperature. Then, after start-up and after the fuel cell has reached the desired temperature, a sufficient quantity of the oxidant and the fuel are supplied to the reactor, to maintain the oxidant supplied to the fuel cell system at a desired humidity level.

Yet another aspect of the present invention provides a method of operating a fuel cell system comprising a plurality of fuel cells, each fuel cell comprising an inlet for fuel, an anode having a catalyst associated therewith for producing cations from fuel, a fuel manifold connected between the inlet and the anode for distributing fuel to the anode, an oxidant inlet means for supplying oxidant, a cathode having a catalyst associated therewith and connected to the oxidant inlet means, for producing anions from the oxidant, said anions reacting with said cations to form water on said cathode and an ion exchange membrane disposed between the anode and the cathode, for facilitating migration of cations from the anode to the cathode, while isolating the fuel and the oxidant from one another, the method comprising:

(a) supplying oxidant and fuel to the fuel cells for reaction to generate electrical power and heat;

(b) supplying fuel to the catalytic reactor and oxidant to the catalytic reactor, in an amount less than the stoichiometric amount required for combustion of fuel, to ensure complete consumption of the oxidant, thereby generating a flow of heated and humidified fuel;

(c) supplying the heated and humidified fuel to the fuel cell, for reaction with oxidant known to generate electricity and heat.

This aspect of the method can include:

(a) providing a second catalytic reactor;

(b) supplying the second reactor with fuel and oxidant in an amount greater than the stoichiometric amount required for combustion of fuel, thereby generating a flow of heated and humidified oxidants; supplying the heated and humidified oxidant to the oxidant inlet means of the fuel cell, for reaction with a heated and humidified fuel to generate electricity and heat. In the prior art, humidification through membrane stacks provided humidification only, without imparting a significant temperature shift. In this invention, both humidity and temperature are imparted to the stream prior to admission to the stack.

The stack can comprise an air-breathing stack, including a plurality of channels extending through the fuel cell stack for permitting free flow of ambient air as the oxidant through the fuel cell stack, there being at least one channel for each fuel cell, wherein the catalytic reactor is mounted below the fuel cell stack. The catalytic converter is configured to receive air as an oxidant through the second inlet thereof in excess of the stoichiometric quantity of air required for combustion of fuel within the catalytic reactor, whereby heated and humidified air is discharged from the outlet of the catalytic reactor. The outlet of the catalytic reactor is mounted below the channels of the fuel cell stack, whereby heated and moistened air flows upwardly through the channels of the fuel cell stack from the catalytic reactor.

The catalytic reactor can be either generally tubular or it can be disk-shaped, configured for flow of fuel and oxidant generally along the central axis of the reactor.

BRIEF DESCRIPTION OF THE DRAWING FIGURES

For a better understanding of the present invention and to show more clearly how it may be carried into effect, reference will now be made, by way of example, to the accompanying drawings which show a preferred embodiment of the present invention and in which.

Figure 3C:
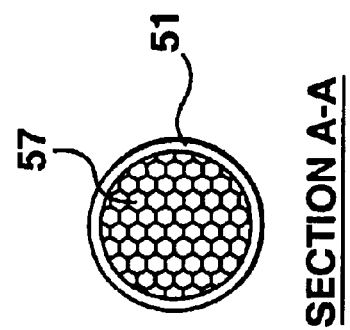
Figure 3B:
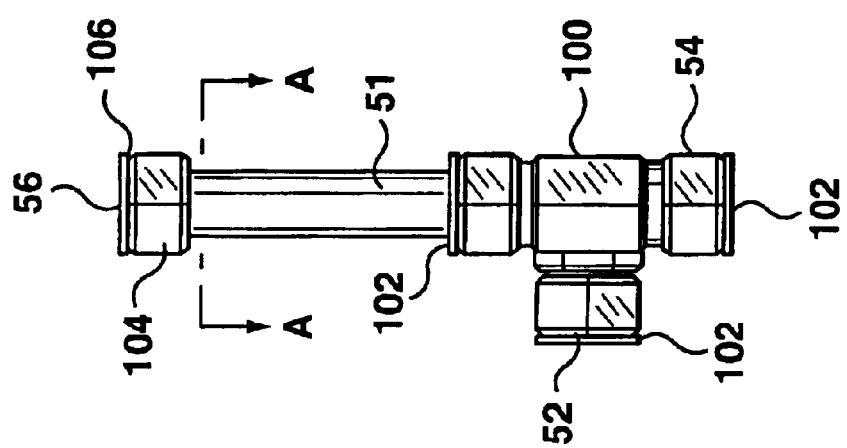
Figure 3A:
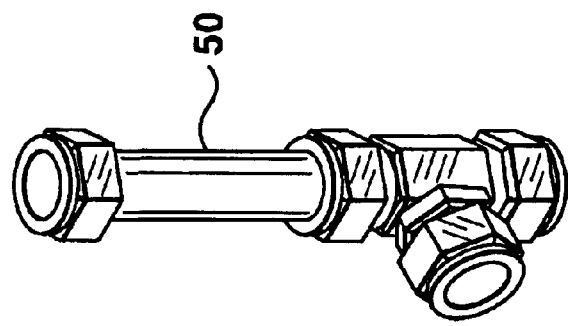

FIGS. 3a, 3b and 3c, respectively, perspective and side and cross-sectional views of a tubular reactor in accordance with the present invention.

Figure 1:
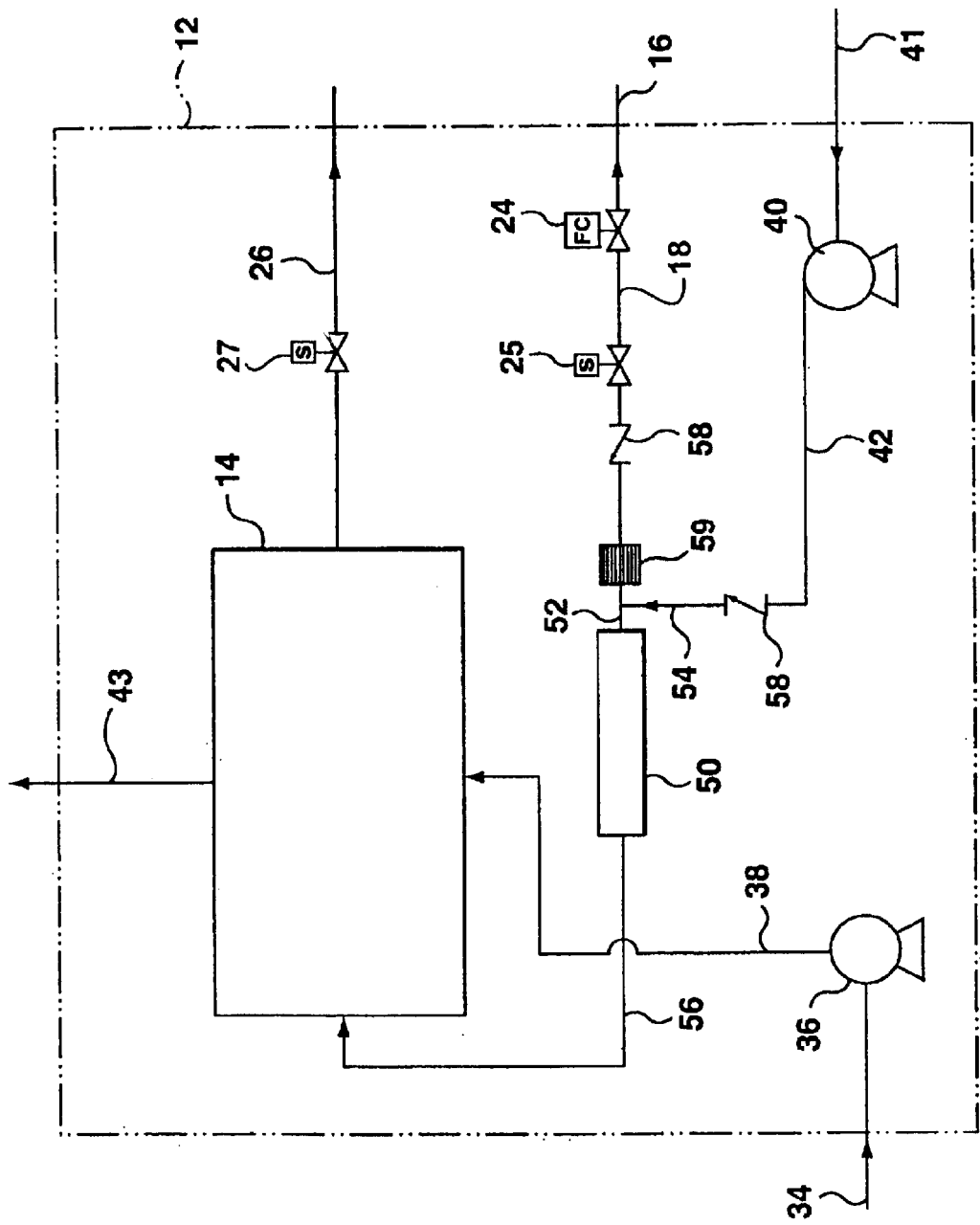
FIG. 1 is a schematic view of the first embodiment of a fuel cell system in accordance with the present invention.
Figure 2:
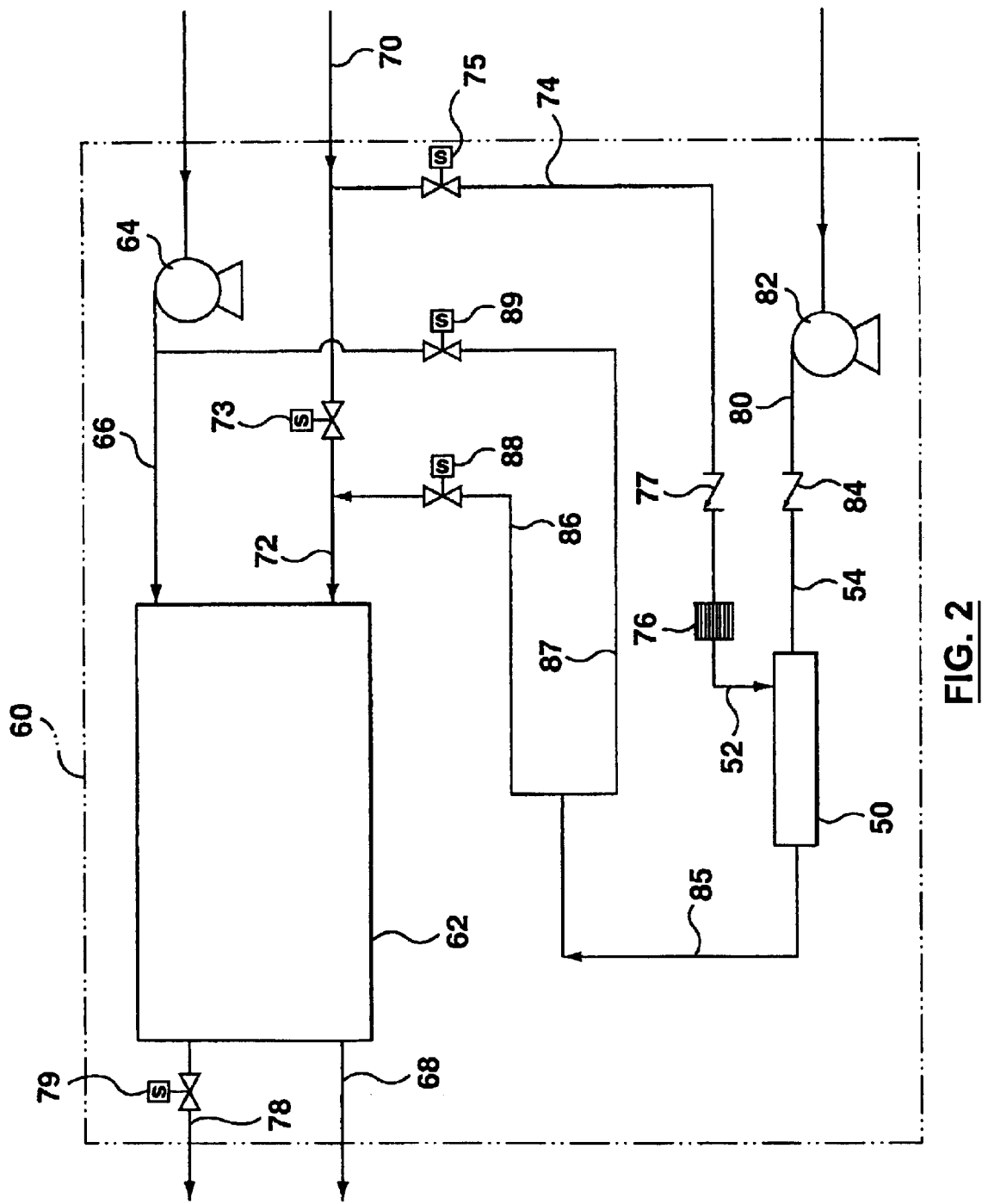
FIG. 2 is a schematic view of a second embodiment of a fuel cell system in accordance with the present invention.
Figure 4:
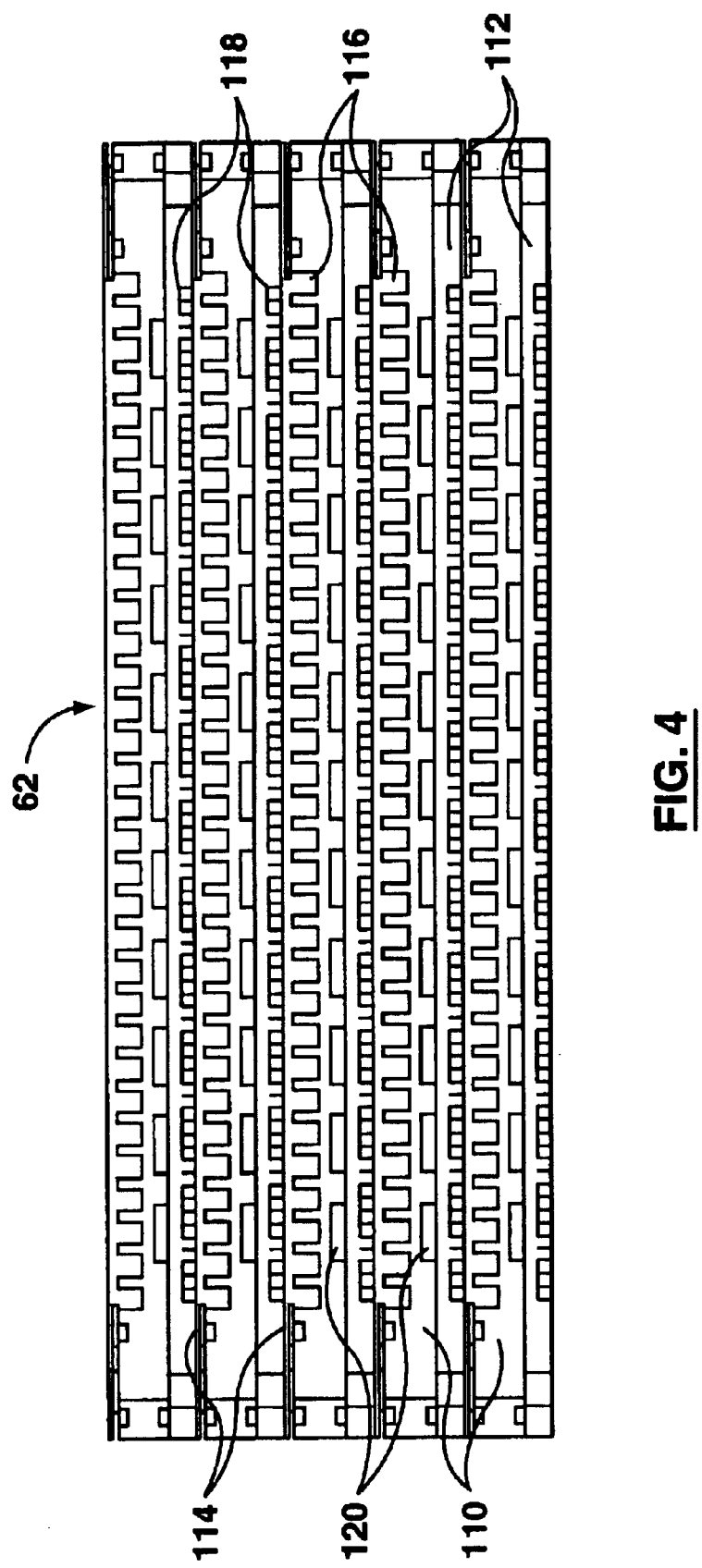

FIG. 4 is a plan view of part of the fuel cell stack of FIGS. 1 and 2; and

Figure 5:
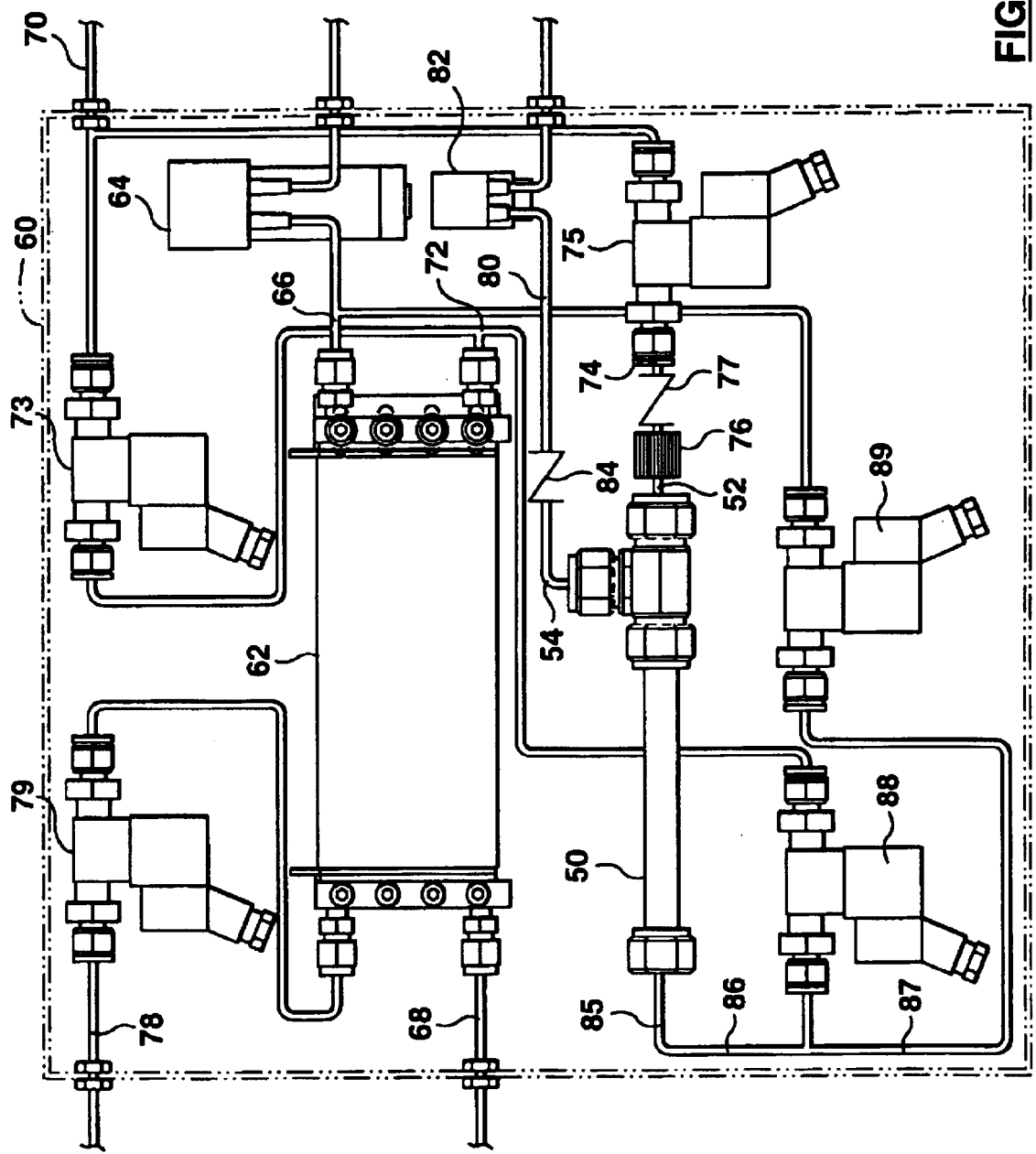

FIG. 5 is a more detailed view of the second embodiment of the fuel cell system shown in FIG. 2.

DESCRIPTION OF THE PREFERRED EMBODIMENT

Referring first to FIG. 1, the first embodiment of the apparatus is indicated generally by the reference 10 and includes an enclosure 12, in the apparatus. In the drawings, this is identified as a HyTef-FC15 Enclosure.

Within the enclosure 12, there is a fuel stack 14 comprising, in known manner, a plurality of PEM fuel cells, and described in greater detail in relation to FIG. 4. For the stack 14, a main fuel supply line 16 is provided for hydrogen. The fuel line 16 extends into the enclosure 12 and continues as a main supply line 18 including a respective flow control valve 24 and a solenoid-operated valve 25. As shown, a stack purge outlet at 26 enables excess hydrogen to be purged from the fuel cell stack 14. A respective solenoid controlled valve 27, controls purging of the hydrogen gas. Again, as is known, this prevents accumulation of contaminants and impurities in the hydrogen fuel, within the fuel cell stack 14. The purged hydrogen through the purge outlet 26 can be recycled for consumption.

The stack can comprise an air-breathing stack, including a plurality of channels extending through the fuel cell stack for permitting free flow of ambient air as the oxidant through the fuel cell stack, there being at least one channel for each fuel cell, wherein the catalytic reaction is mounted below the fuel cell stack. The catalytic converter is configured to receive air as an oxidant through the second inlet thereof in excess of the stoichiometric quantity of air required for combustion of fuel within the catalytic reaction, whereby heated and humidified air is discharged from the outlet of the catalytic reaction. The outlet of the catalytic reaction is mounted below the channels of the fuel cell stack, whereby heated and moistened air flows upwardly through the channels of the fuel cell stack from the catalytic reactor.

The catalytic reactor can be either generally tubular or it can be disk-shaped, configured for flow of fuel and oxidant generally along the central axis of the reactor.

The fuel cell stack 14 in FIG. 1 is a closed stack. Hydrogen fuel flows through the anode side of each individual fuel cell in known manner. Correspondingly, an air inlet 34 is provided, connected to an air line 38. A pump 36 for the air is provided, and an air exhaust indicated at 43.

In accordance with the present invention, the fuel or hydrogen supply line 16 is connected to a catalytic reactor 50, which includes a catalytic reactor bed 57 (FIG. 3), comprising, for example reticulated aluminum; this material is chosen for its thermal conductivity, cost and ease of use. A separate air inlet 41 is provided, connected via a pump 40 and an air supply line 42 to the catalytic reactor 50. Non-return valves 58 prevent back flow of air and fuel, and a flash arrestor 59 is provided for the fuel cell.

The catalytic reactor 50 is generally tubular, has respective inlets 52 and 54 for hydrogen and air, and a tubular outlet 56. A flow of heated, humidified fuel exits from the tubular outlet 56, and will then flow to the fuel inlet of the fuel cell stack.

Reference will now be made to FIG. 2, which shows a third embodiment of the present invention. This embodiment of the invention again can have an enclosure, as indicated at 60, and again includes a fuel cell stack, here indicated at 62. The stack 62 here is a closed stack, and is provided with an air pump or blower 64 connected by a main supply line 66 to an inlet of the fuel cell stack 62, and excess air exhausts from the fuel cell stack 62 as indicated at 68.

On the hydrogen side, a hydrogen supply line 70 can include a pressure gauge and a flow meter (not shown), and comprises a main hydrogen supply line 72 to the fuel cell stack 62 and a secondary supply line 74 to the catalytic burner or reactor. A solenoid valve 73 is provided in the main supply line 72, and a solenoid valve 75, a flash arrestor 76 and a non-return valve 77 are provided in the secondary line 74. A fuel purge valve 78 with a controlling solenoid valve 79 are provided as for the first embodiment.

The tubular, catalytic reactor 50 is again provided and the hydrogen inlet 52 is again provided at the side of the reactor.

An air supply line for the catalytic reactor 50 is indicated at 80 and includes a pump or meter 82, and a respective non-return valve 84. The air supply line 80 is connected to a respective inlet 54. Optionally, a pressure gauge and a flow meter can be provided.

The outlet 56 of the tubular reactor 50 is connected by a line 85, to two branch lines 86 and 87, which are connected by respective solenoid valves 88 and 89 to the supply line 72 and to the air supply line 66. Although not shown, the stack 62 can optionally include a recirculation pump. Excess hydrogen can, in a known manner, be purged through the outlet 68 or purge line 78, to prevent build-up of contaminants.

The tubular reactor 50 can be run to provide either a humidified and heated flow of air or a humidified and heated flow of hydrogen. These two modes of operation are detailed below.

To generate a flow of heated and humidified air, excess air is delivered by the pump 82, relative to the hydrogen flow through the line 74. In the tubular reactor 50, the oxygen reacts with the hydrogen to generate heat and moisture. This results in a heated and moistened air flow exiting through the outlet 56. Then, the valve 88 is maintained closed and the valve 89 is opened, so that the heated and moistened air flow passes through to the main air supply line 66, to be entrained into the air flow passing to the fuel cell stack 62.

Correspondingly, to generate a heated hydrogen flow, the valve 88 is opened and the valve 89 closed. Then, excess hydrogen is supplied through the line 74, as compared to air supplied through the main fuel line 82. The flow is dead ended and is only exhausted during purging when the exhaust solenoid is open. However, the flow can be controlled using control valves when not operated in dead-ended mode. In the tubular reactor 50, the oxygen in the air reacts with some of the hydrogen to generate heat and moisture. The flow of hydrogen, with residual nitrogen, together with heat and moisture, then exits from the outlet 56. This flow of heated and humidified nitrogen and hydrogen gas passes through valve 88 into the main fuel line 72.

It will be appreciated that where heated and humidified hydrogen is supplied to the fuel line 72, and as air is used as the oxidant, this does result in nitrogen being injected into the fuel gas supply. For this reason, the purge line 78 will need to be used, to prevent the build-up of nitrogen within the fuel cell stack 62. Alternatively, a flowing system can be used at all times.

It is important that, in the tubular, catalytic reactor 50, complete reaction takes place. In other words, it is essential that, in the two modes of operation, residual hydrogen is not delivered to the main air line 66, nor residual oxygen delivered to the hydrogen supply line 72. This could result in potentially flammable gas mixtures of hydrogen and oxygen being delivered to the fuel cell stack 62, which is dangerous. To ensure complete reaction, proper topology and morphology of the reactor must be designed, essentially to ensure adequate residence time over the full range of flow rates.

It will also be understood that it is possible to heat and humidify both of the fuel and air supply lines. Because of the different requirements of the two supply lines, this would require the provision of two separate tubular reactors, each of which would be configured to operate in one of the two modes outlined above.

Turning to FIG. 3, this shows, in detail, the tubular reactor 50. It is to be appreciated that this is an early version of the tubular reactor 50, and in particular, the housing of the tubular reactor 50 is made from conventional, off-the-shelf components. It is anticipated that the overall configuration of the tubular reactor 50 can be enhanced to give a design which both has better performance characteristics, and is more economical to manufacture.

The tubular reactor 50 comprises a tubular reactor housing 51. At the lower end thereof, a T-connector 100 is provided. The T-connector 100 has three coupling flanges 102, one of which is connected to the tubular housing 51, and the two others of which provide connections for the hydrogen supply lines. At the top end, the tubular reactor 50 includes a connector 104, again provided with connection flanges 106, one of which is connected to the tubular housing 51 and the others of which provide connections to supply lines. While a housing 51 of circular cross-section is shown, it will be understood that any suitable cross-section, for example a square cross-section, could be used.

Reference will now be made to FIG. 4. This shows a plan view of, for example five pairs of flow field plates making up five individual fuel cell elements in the fuel cell stack 62. Thus, there are oxidant flow field plates indicated at 110. Fuel flow field plates are indicated at 112. Between each pair of oxidant and fuel flow field plates 110,112, there is located a respective membrane electrode assembly (MEA) and gas diffusion media 114. Between the oxidant flow field plates 110 and the MEA 114, there are defined oxidant channels 116, and fuel flow hydrogen channels 118 are defined between the fuel flow field plates 112 and the MEA 114. Cooling channels 120 are provided in the back of the oxidant flow field plates 110, against the fuel flow field plates 112. These cooling channels 120 are, like the oxidant channels 116, simply channels extending vertically (not necessarily vertical) through the stack 62, to provide free flow of ambient air through the channels. In known manner, other constructional details of the stack, e.g. elements holding the various flow field plates together, are not shown, but these can be conventional.

What is claimed is:

1. A method of operating a fuel cell system comprising a plurality of fuel cells, each fuel cell comprising a fuel inlet for a fuel, an anode having a catalyst associated therewith for producing cations from the fuel, a fuel manifold connected between the fuel inlet and the anode for distributing the fuel to the anode, an oxidant inlet means for supplying oxidant, a cathode having a catalyst associated therewith and connected to the oxidant inlet means for producing anions from the oxidant, said anions reacting with said cations to form water on said cathode and an ion exchange membrane disposed between the anode and the cathode, for facilitating migration of cations from the anode to the cathode, while isolating the fuel and oxidant from one another, the method comprising (a) supplying one part of the oxidant to the oxidant inlet means an of the fuel cells for reaction to generate electrical power and heat;

(b) providing a catalytic reactor for promoting reaction of the fuel and the oxidant, supplying the fuel to the catalytic reactor and supplying another part of the oxidant to the catalytic reactor in an amount less than the stoichiometric amount required for the combustion of the fuel supplied to the catalytic reactor, to ensure complete consumption of the other part the oxidant, thereby generating a flow of heated and humidified fuel;

(c) supplying the heated and humidified fuel to the fuel inlets of the fuel cells, for reaction with said one part of the oxidant to generate electricity and heat; and (d) supplying the fuel and the other part of the oxidant to the catalytic reactor, prior to supply thereof to the fuel cells.

2. A method as claimed in claim 1, which comprises, for initial start-up below a preset temperature, initially only supplying the fuel and the other part of oxidant to the catalytic reactor to generate a flow of heated and humidified fuel, and passing the heated and humidified fuel through the fuel cells to preheat the fuel cells, and commencing supply of the one part of the oxidant to the fuel cells, once the fuel cells reach a desired temperature.

3. A method as claimed in claim 2, which includes, after start-up and after the fuel cells have reached the desired temperature, supplying a sufficient quantity of the oxidant and the fuel to the catalytic reactor, to maintain the fuel supplied to the fuel cell system at a desired humidity level.

4. A method as claimed in claim 3, which includes: supplying air as the oxidant; providing the fuel cell system as an air-breathing system including vertical channels for flow of air as the oxidant; and providing a portion of the air as the other part of the oxidant for the catalytic reactor, with additional air flowing directly through the channels of the fuel cell system as the one part of the oxidant.

5. A method as claimed in claim 1, which includes:

(a) providing a second catalytic reactor for promoting reaction of the fuel in the oxidant, supplying a further part of the fuel to the catalytic reactor and supplying at least a portion of the one part of the oxidant to the second catalytic reactor in an amount greater than the stoichiometric amount required for the combustion of the fuel to ensure complete consumption of the fuel and thereby to generate a flow of heated and humidified oxidant; and (b) supplying the heated and humidified oxidant to the fuel cell for reaction with the heated and humidified fuel.

6. A method as claimed in claim 5, wherein each of the first and second catalytic reactors is generally tubular.

7. A method as claimed in claim 5, which includes supply lines for fuel and oxidant connected to the first and second catalytic reactors, and check valves in the supply lines for preventing back flow of oxidant and fuel.

8. A method as claimed in claim 7, which includes flash arresters in the supply lines for the fuel connected to the first and second catalytic reactors.

9. A method as claimed in claim 7 or 8, which includes a pump for delivering air as an oxidant to the first and second catalytic reactors.

10. A method as claimed in claim 1, 2, 3 or 4, which includes supplying one part of the fuel directly to the fuel cells and supplying another part of the fuel to the catalytic reactor for heating and humidification, and mixing the one part and the heated and humidified other part of fuel prior to supply to the fuel cell.

* * * * *

UNITED STATES PATENT AND TRADEMARK OFFICE
CERTIFICATE OF CORRECTION

PATENT NO. : 6,790,546 B2
DATED : September 14, 2004
INVENTOR(S) : Chen et al.

It is certified that error appears in the above-identified patent and that said Letters Patent is hereby corrected as shown below:

<u>Column 7, lines 50-67 through Column 8, lines 1-16,</u>
Claim 1 should read as follows:

1. A method of operating a fuel cell system comprising a plurality of fuel cells, each fuel cell comprising a fuel inlet for a fuel, an anode having a catalyst associated therewith for producing cations from the fuel, a fuel manifold connected between the fuel inlet and the anode for distributing the fuel to the anode, an oxidant inlet means for supplying oxidant, a cathode having a catalyst associated therewith and connected to the oxidant inlet means for producing anions from the oxidant, said anions reacting with said cations to form water on said cathode and an ion exchange membrane disposed between the anode and the cathode, for facilitating migration of cations from the anode to the cathode, while isolating the fuel and oxidant from one another, the method comprising (a) supplying one part of the oxidant to the oxidant inlet means an of the fuel cells for reaction to generate electrical power and heat;

(b) providing a catalytic reactor for promoting reaction of the fuel and the oxidant, supplying the fuel to the catalytic reactor and supplying another part of the oxidant to the catalytic reactor in an amount less than the stoichiometric amount required for the combustion of the fuel supplied to the catalytic reactor, to ensure complete consumption of the other part the oxidant, thereby generating a flow of heated and humidified fuel;

(c) supplying the heated and humidified fuel to the fuel inlets of the fuel cells, for reaction with said one part of the oxidant to generate electricity and heat; and (d) supplying the fuel and the other part of the oxidant to the catalytic reactor, prior to supply thereof to the fuel cells.

<u>Column 7,</u>
Line 66, delete "an".

Signed and Sealed this

Eleventh Day of January, 2005

JON W. DUDAS
*Director of the United States Patent and Trademark Office*